(12) United States Patent
Zhang

(10) Patent No.: US 6,621,614 B1
(45) Date of Patent: Sep. 16, 2003

(54) ETALONS WITH VARIABLE REFLECTIVITY

(75) Inventor: Qin Zhang, San Jose, CA (US)

(73) Assignee: Arista Networks, Inc., Palo Alto, CA (US)

(*) Notice: Subject to any disclaimer, the term of this patent is extended or adjusted under 35 U.S.C. 154(b) by 0 days.

(21) Appl. No.: 10/087,087

(22) Filed: Feb. 27, 2002

Related U.S. Application Data

(60) Provisional application No. 60/311,498, filed on Aug. 10, 2001.

(51) Int. Cl.$^7$ .............................. G02F 1/03; G02F 1/13; G01B 9/02

(52) U.S. Cl. ...................... 359/260; 349/198; 356/454

(58) Field of Search ............................. 356/454, 480, 356/506, 519, 345; 359/577, 245, 260–265; 349/198; 372/20, 32, 26, 18, 19, 30; 385/14, 16, 24; 257/21

(56) References Cited

U.S. PATENT DOCUMENTS

| | | | |
|---|---|---|---|
| 4,395,769 A | * | 7/1983 | Damen et al. ............... 372/7 |
| 5,557,468 A | | 9/1996 | Ip ............................... 359/615 |
| 5,828,689 A | | 10/1998 | Epworth ...................... 372/98 |
| 6,115,121 A | | 9/2000 | Erskine |

FOREIGN PATENT DOCUMENTS

| | | | | |
|---|---|---|---|---|
| EP | 0 426 357 B1 | 4/1996 | ............ | H04B/10/18 |
| EP | 0 997 751 A2 | 5/2000 | ............ | G02B/6/293 |

OTHER PUBLICATIONS

Cimini, L.J., Jr., et al., "Optical Equalization for High–Bit–Rate Fiber–Optic Communications," *IEEE Photonics Technology Letters*, vol. 2, No. 3 (Mar. 1990), pp. 200–202.

Cimini, Leonard J., Jr., et al., "Optical Equalization to Combat the Effects of Laser Chirp and Fiber Dispersion," *Journal of Lightwave Technology*, vol. 8, No. 5 (May 1990), pp. 649–659.

French, P.M.W., et al., "Tunable Group Velocity Dispersion Interferometer for Intracavity and Extracavity Applications," *Optics Communications*, vol. 57, No. 4 (Mar. 15, 1986), pp. 263–268.

Garthe, D., et al., "Low–loss dispersion equaliser operable over the entire erbium window," *Electronics Letters*, vol. 32 (1996), pp. 371–373.

Gnauck, A.H., et al., "8–Gb/s–130 km Transmission Experiment Using Er–Doped Fiber Preamplifier and Optical Dispersion Equalization," *IEEE Transactions Photonics Technology Letters*, vol. 3, No. 12 (Dec. 1991), pp. 1147–1149.

Gnauck, A.H., et al., "Optical Equalization of Fiber Chromatic Dispersion in a 5–Gb/s Transmission System," *IEEE Photonics Technology Letters*, vol. 2, No. 8 (Aug. 1990), pp. 585–587.

MacFarlane, Duncan L., et al., "Z–domain techniques in the analysis of Fabry–Perot étalons and multilayer structures," *Journal of the Optical Society of America A*, vol. 11, No. 1 (Jan. 1994), pp. 236–245.

Madsen, C.K., et al., "A Tunable Dispersion Compensating MEMS All–Pass Filter," *IEEE Photonics Technology Letters*, vol. 12, No. 6 (Jun. 2000), pp. 651–653.

(List continued on next page.)

*Primary Examiner*—Loha Ben
*Assistant Examiner*—William Choi
(74) *Attorney, Agent, or Firm*—Fenwick & West LLP

(57) ABSTRACT

An etalon has a first surface which is partially reflective. The reflectivity of the first surface varies with position. Thus, this reflectivity can in effect be adjusted by varying the point at which an optical beam is incident upon the etalon. At one point of incidence, the optical beam experiences one reflectivity. At a different point of incidence, the optical beam experiences a different reflectivity.

44 Claims, 11 Drawing Sheets

OTHER PUBLICATIONS

Madsen, C.K., et al., "Integrated All–Pass Filters for Tunable Dispersion and Dispersion Slope Compensation," *IEEE Photonics Technology Letters*, vol. 11, No. 12 (Dec. 1999), pp. 1623–1625.

Madsen, C.K., et al., "Optical All–Pass Filters for Phase Response Design with Applications for Dispersion Compensation," *IEEE Photonics Technology Letters*, vol. 10, No. 7 (Jul. 1998), pp. 994–996.

Saleh, A.A.M., et al., "Two–Stage Fabry–Perot Filters as Demultiplexers in Optical FDMA LAN's," *Journal of Lightwave Technology*, vol. 7, No. 2 (Feb. 1989), pp. 323–329.

Skinner, Wilbert R., et al., "Optimization of a triple etalon interferometer," *Applied Optics*, vol. 26, No. 14 (Jul. 15, 1987), pp. 2817–2827.

\* cited by examiner

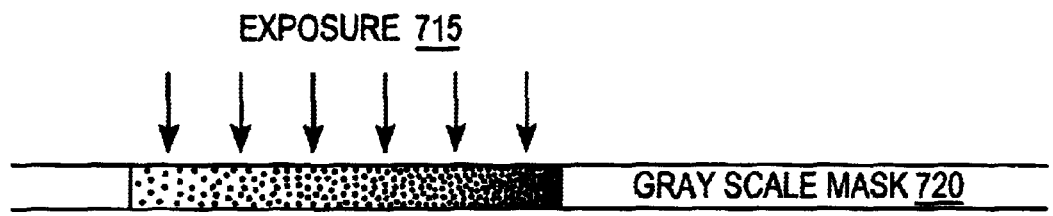
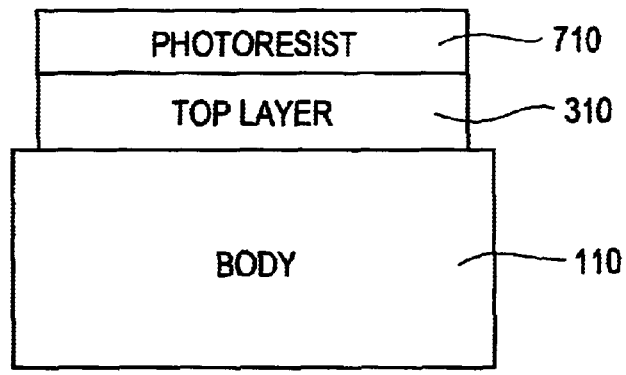
FIG. 7A
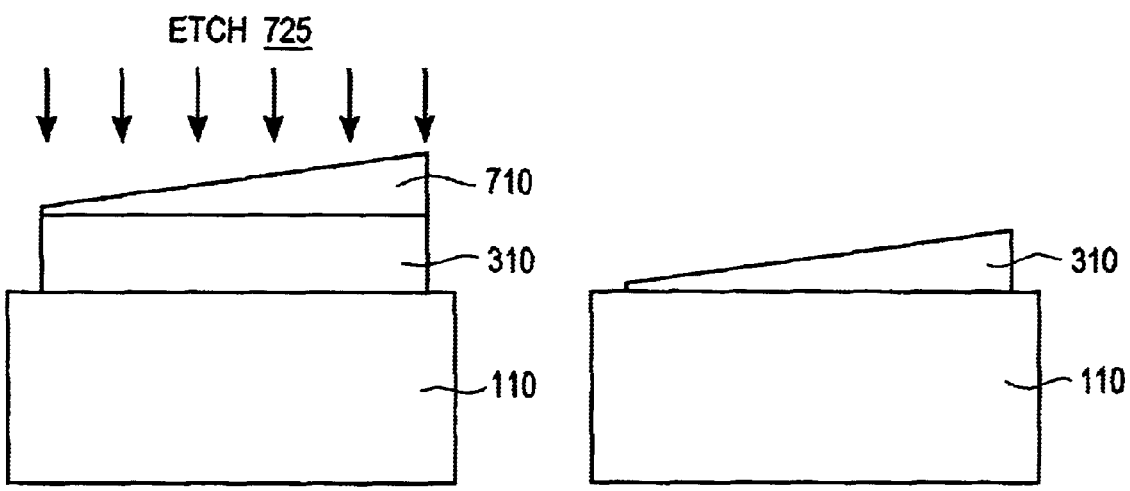
FIG. 7B
FIG. 7C

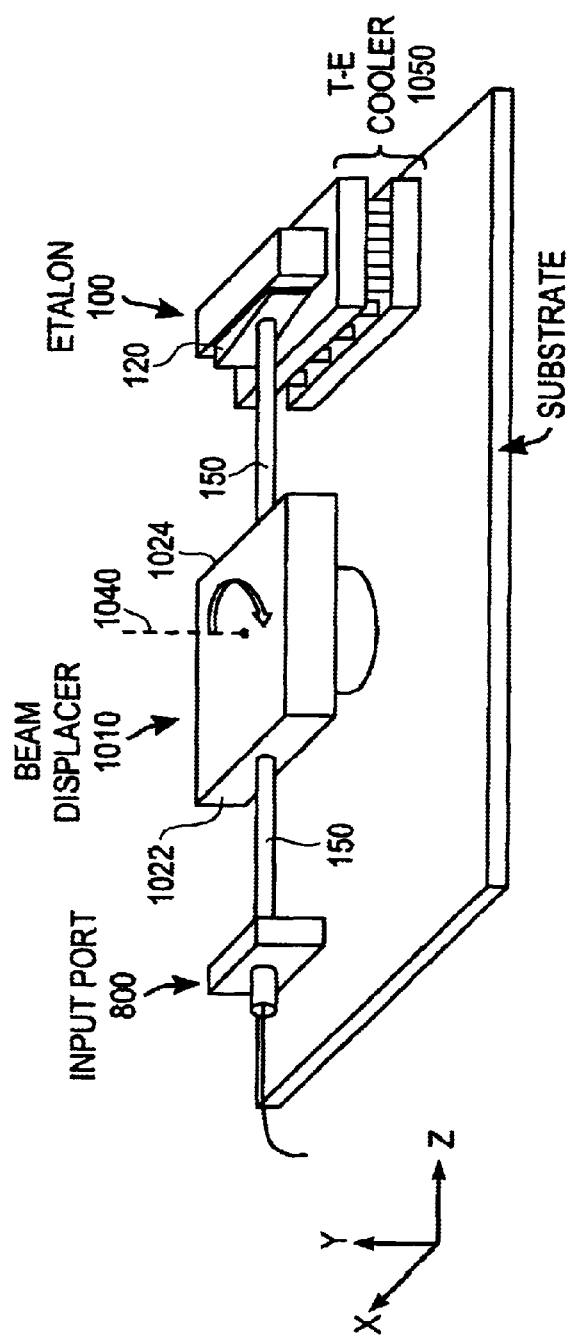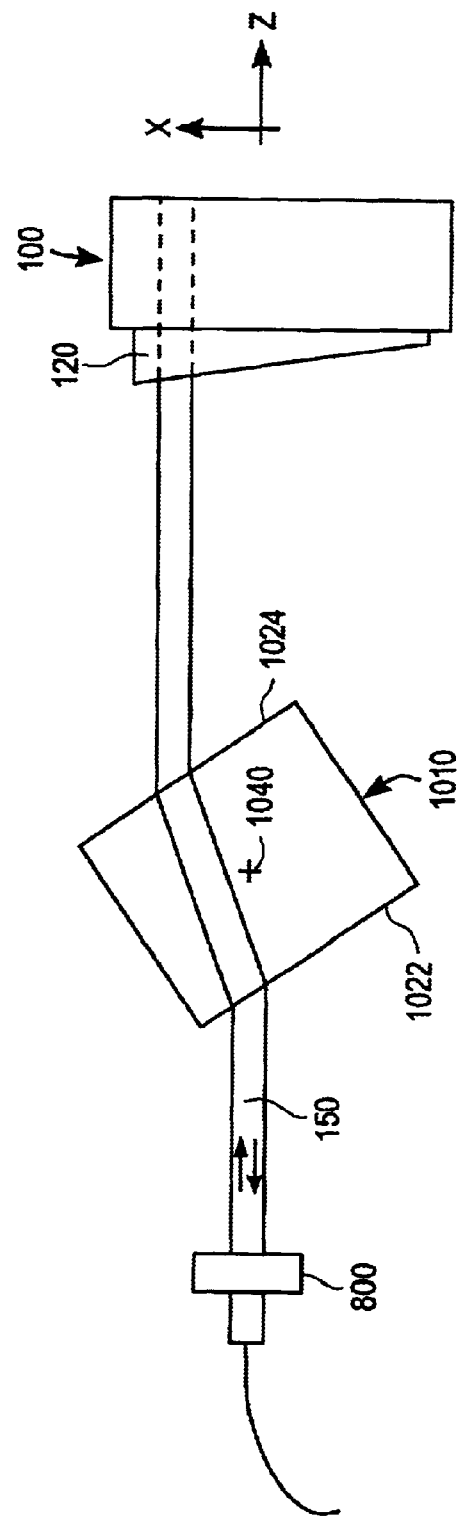
FIG. 10A
FIG. 10B

ETALONS WITH VARIABLE REFLECTIVITY

CROSS-REFERENCE TO RELATED APPLICATION

This application claims priority under 35 U.S.C. § 119(e) to U.S. Provisional Patent Application Serial No. 60/311, 498, "Method and Apparatus for Tunable Chromatic Dispersion Based on Gradient Reflectivity Etalons," by Qin Zhang and Jason T. Yang, filed Aug. 10, 2001. The subject matter of the foregoing is incorporated herein by reference in its entirety.

BACKGROUND OF THE INVENTION

1. Field of the Invention

This invention relates generally to etalons in which the reflectivity of the etalon varies according to spatial location.

2. Description of the Related Art

As the result of recent advances in technology and an ever-increasing demand for communications bandwidth, there is increasing.interest in optical communications systems, especially fiber optic communications systems. This is because optical fiber is a transmission medium that is well-suited to meet the demand for bandwidth. Optical fiber has a bandwidth which is inherently broader than its electrical counterparts. At the same time, advances in technology have increased the performance, increased the reliability and reduced the cost of the components used in fiber optic systems. In addition, there is a growing installed base of laid fiber and infrastructure to support and service the fiber.

Despite this progress, optical communications is still in many respects very different from its electrical counterparts. Optical communications is inherently optical and relies on the manipulation of lightwave signals. As a result, many of the basic components used in fiber optic systems are unique to the optical domain: lasers, electro-optic and electro-absorptive modulators, photodetectors, lenses, beam splitters, gratings, waveguides, couplers, and wavelength filters to name a few.

Etalons are one basic type of optical component. An etalon basically includes a pair of parallel surfaces, each with a predetermined reflectivity, and a plano-plano cavity between the two surfaces. Light which enters the etalon circulates within the etalon cavity . The resulting interference between multiply reflected waves causes interesting behavior. This behavior can potentially be used for a number of useful applications. For example, etalons have been suggested for use as wavelength filters. They potentially can also be used for dispersion compensation.

A simple etalon only has a few degrees of freedom. The reflectivity of the surface(s) and the free spectral range (determined by the optical length of the cavity) are two major ones. It would be desirable to have etalons in which one or more of these degrees of freedom can be adjusted. The adjustments can be used to compensate for variations in manufacturing and/or to tune the performance of the etalon. Adjustability would also permit the same etalon to be used under a variety of conditions. For example, if a change in a fiber optic system required a corresponding change in the reflectivity of the etalon, it is usually more advantageous to have an etalon with an adjustable reflectivity rather than requiring the replacement of a fixed reflectivity etalon with another fixed reflectivity etalon.

Conventionally, reflective surfaces for etalons are produced by depositing thin layers of dielectric materials onto an optically flat surface, with the thickness and material composition of the layers determining the reflectivity. Conventional processes are capable of yielding dielectric layers of a fairly uniform and predetermined thickness across the surface. As a result, the reflectivity of an etalon's surfaces can be fairly well controlled. However, in such an approach, the layers deposited are uniform across the entire surface and, therefore, the reflectivity is also the same across the entire surface. In order to achieve a reflectivity which varies by location, the layers must be varied in some fashion. However, it can be difficult to do this with repeatable accuracy on an optical surface while also maintaining the optical smoothness of the surface quality.

Thus, there is a need for etalons with variable parameters, such as surface reflectivity.

SUMMARY OF THE INVENTION

The present invention overcomes the limitations of the prior art by providing an etalon in which the reflectivity of a first surface (i.e., the partially reflective surface) varies with position. Thus, this reflectivity can in effect be adjusted by varying the point at which an optical beam is incident upon the etalon. At one point of incidence, the optical beam experiences one reflectivity. At a different point of incidence, the optical beam experiences a different reflectivity.

In one implementation, the etalon includes a transparent body having a first surface and a second surface that are substantially plane-parallel. A second dielectric reflective coating with a reflectivity of substantially 100% is disposed upon the second surface. A first dielectric reflective coating is disposed upon the first surface. The reflectivity of the first reflective coating varies according to location on the first surface. In one embodiment, the first reflective coating includes a top layer of varying physical thickness. For example, the top layer may exhibit a thickness variation of approximately a quarter wave of optical thickness (i.e., from zero to a quarter wave, or from a quarter wave to a half wave, etc.).

Another aspect of the invention concerns the manner for varying the point of incidence of an optical beam on the etalon. In most implementations, the optical beam is received through an input port and directed to the etalon. In one class of devices, the input port and/or etalon are translated with respect to each other, thus varying the point of incidence. In another class of devices, the input port and etalon are in fixed locations relative to each other. However, a beam displacer located in the optical path between the input port and the etalon is used to vary the point of incidence.

In one example, the beam displacer includes a second transparent body having parallel input and output surfaces. The optical beam enters the second transparent body through the input surface and exits the second transparent body through the output surface. Because the two surfaces are parallel, the optical beam exits the body in the same direction as it entered but laterally displaced by some amount. The second transparent body can be rotated about an axis perpendicular to the direction of propagation of the optical beam. Rotating the second transparent body about the axis changes the amount of lateral displacement, thus changing the point of incidence of the optical beam on the etalon.

Another aspect of the invention concerns the manufacture of such etalons. In one approach, the first reflective coating is created (at least in part) by depositing a top layer of uniform thickness and then removing different thicknesses of the top layer at different locations. The remaining top layer has a varying thickness. For example, the uniform top layer may be covered by a layer of photoresist that has a varying thickness. The photoresist layer and top layer are then etched in a uniform etching process. In areas where the photoresist is thick, less of the top layer will be removed. In areas where the photoresist is thin, more of the top layer will be removed. In an alternate approach, the first reflective coating is created by depositing a top layer of varying thickness.

BRIEF DESCRIPTION OF THE DRAWING

The invention has other advantages and features which will be more readily apparent from the following detailed description of the invention and the appended claims, when taken in conjunction with the accompanying drawing, in which:

FIGS. 7A–7C are side views of a variable reflectivity etalon illustrating one method for manufacturing the etalon.

FIGS. 10A–10B are a perspective view and top view of an apparatus that utilizes a rotatable beam displacer.

DETAILED DESCRIPTION OF THE PREFERRED EMBODIMENTS

Figure 1:
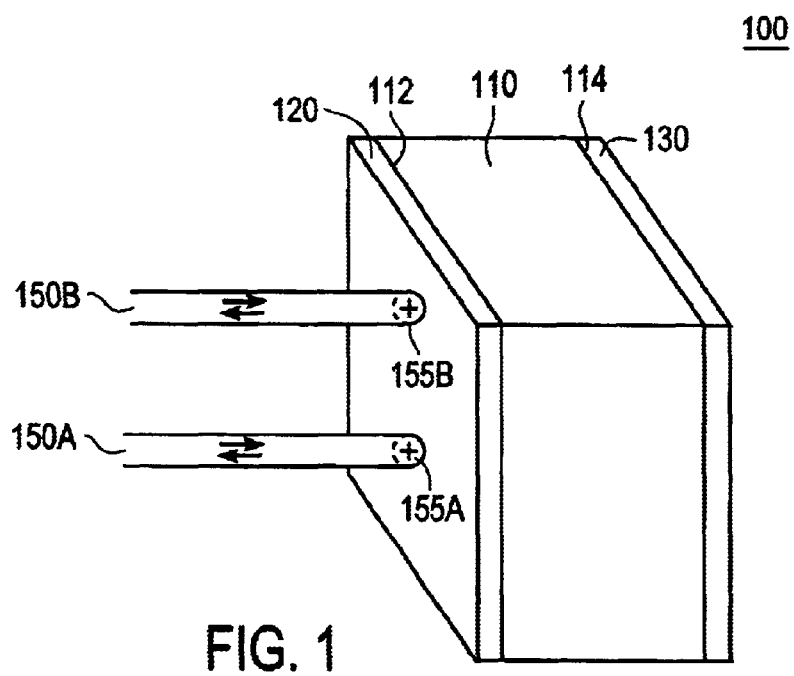
FIG. 1 is a perspective view of a variable reflectivity etalon.

FIG. 1 is a perspective view of a variable reflectivity etalon 100. The etalon 100 includes a transparent body 110 having a first surface 112 and a second surface 114. The first surface 112 and second surface 114 are substantially plane-parallel.

In one implementation, the transparent body 110 is made from a single block of material, as is suggested by FIG. 1. In another implementation, the transparent body 110 is made from blocks of different materials. For example, different materials may be bonded together to form a sandwich-type structure for the transparent body 110 (e.g., see FIG. 8). Alternately, some or all of the transparent body 110 may be formed by an air space or liquid crystal. In one implementation, in order from first surface 112 to second surface 114, the transparent body 110 consists of a first block of material, an air space, and a second block of material. The air space is maintained by spacers between the two blocks of material.

The first and second surfaces 112 and 114 are substantially plane-parallel in the sense that an optical beam 150 which is normally incident upon the first surface 112 also strikes the second surface 114 at an approximately normal angle of incidence. As will be seen in the examples below, it is not essential that the two surfaces 112 and 114 be exactly plane or exactly parallel. In typical cases, a parallelism of better than 0.5 arcsecond is sufficient although actual tolerances will vary by application. Furthermore, in certain cases, the optical path of a beam 150 through the etalon 100 may not be a straight line, For example, the optical beam 150 may be refracted through an angle at an internal interface in the etalon 100, or the optical path may be folded to form a more compact device by using mirrors, prisms or similar devices. In these cases, the first and second surfaces 112 and 114 may not be physically plane-parallel but they will still be optically plane-parallel. That is, the surfaces 112 and 114 would be physically plane-parallel if the optical path were unfolded into a straight line.

A second dielectric reflective coating 130 is disposed upon the second surface 114. For applications in which the optical beam 150 exits via the first surface 112 and low loss is desired, the second coating 130 has a reflectivity which is substantially 100%. A reflectivity somewhere in the range of 90–100% is typical, although the actual reflectivity will vary by application. If the reflectivity of second coating 130 is less than 100%, then light which is transmitted by the second coating 130 can be used to monitor the etalon 100. In applications where higher loss can be tolerated or the optical beam exits at least partially through the second surface 114, the reflectivity of second coating 130 can be significantly less than 100%. A first dielectric reflective coating 120 is disposed upon the first surface 112. The first reflective coating 120 has a reflectivity that varies according to location on the first surface 112.

The etalon 100 functions as follows. An optical beam 150 is incident upon the first surface 112 of the etalon 100 at a normal angle of incidence. The reflectivity of the etalon surfaces 112 and 114 results in multiple beams which interfere, thus producing etalon behavior. If the incoming optical beam is perfectly normal to the etalon's first surface 112 and the two surfaces 112 and 114 (and the coatings 120 and 130) are perfectly plane parallel, the output beam will exit the etalon 100 at the same location as the original point of incidence and will be collinear with the incoming beam 150 (but propagating in the opposite direction). The incoming and outgoing beams may be spatially separated at first surface 112 by introducing a slight tilt to the beam 150.

FIG. 1 shows two different positions for optical beam 150. In position A, the optical beam 150A strikes the first surface 112 at point of incidence 155A. In position B, the point of incidence is 155B. As will be shown below, different approaches can be used to translate the point of incidence to different locations on the etalon's first surface 112 while maintaining normal incidence of the optical beam. Typically in a packaged device, the optical beam 150 arrives via some input port, propagates through the etalon and exits via an output port. In one class of approaches, the input port and/or the etalon 100 are moved in order to translate the point of incidence 155 to different locations. In another class of approaches, the input port and etalon are fixed relative to each other, but a separate beam displacer changes the point of incidence of the optical beam. 150 on the etalon 100.

At the two different points of incidence 155A and 155B, the first reflective coating 120 has a different reflectivity. Therefore, optical beam 150A is affected differently by etalon 100 than optical beam 150B. In effect, the reflectivity of the etalon can be adjusted by varying the point of incidence 155.

In one application, the etalon 100 is used for dispersion compensation. The dispersion D introduced by an etalon 100 can be calculated using conventional principles. In particular, the phase modulation φ introduced by etalon 100 is given by $$\phi = 2\tan^{-1}\left(\frac{r\sin\omega T}{1 + r\cos\omega T}\right) \quad (1)$$

where $r^2 = R$ is the reflectivity of the first coating 120, the second coating 130 is assumed to be 100% reflective, T is the round-trip delay induced by the etalon, and ω is the frequency of the optical beam 150. Specifically, T=OPL/c where c is the speed of light in vacuum and OPL is the total optical path length for one round trip through the etalon 100. If the one-way optical path through the etalon is a straight line of length. L through material of refractive index n, then OPL=2nL. The group delay resulting from Eqn. (1) is $$\tau(\omega) = -\frac{d\phi(\omega)}{d\omega} = -2rT\frac{r + \cos\omega T}{1 + r^2 + 2r\cos\omega T} \quad (2)$$

The dispersion D of the etalon is then $$D(\lambda) = \frac{d\tau(\lambda)}{d\lambda} \quad (3)$$

Figure 2A:
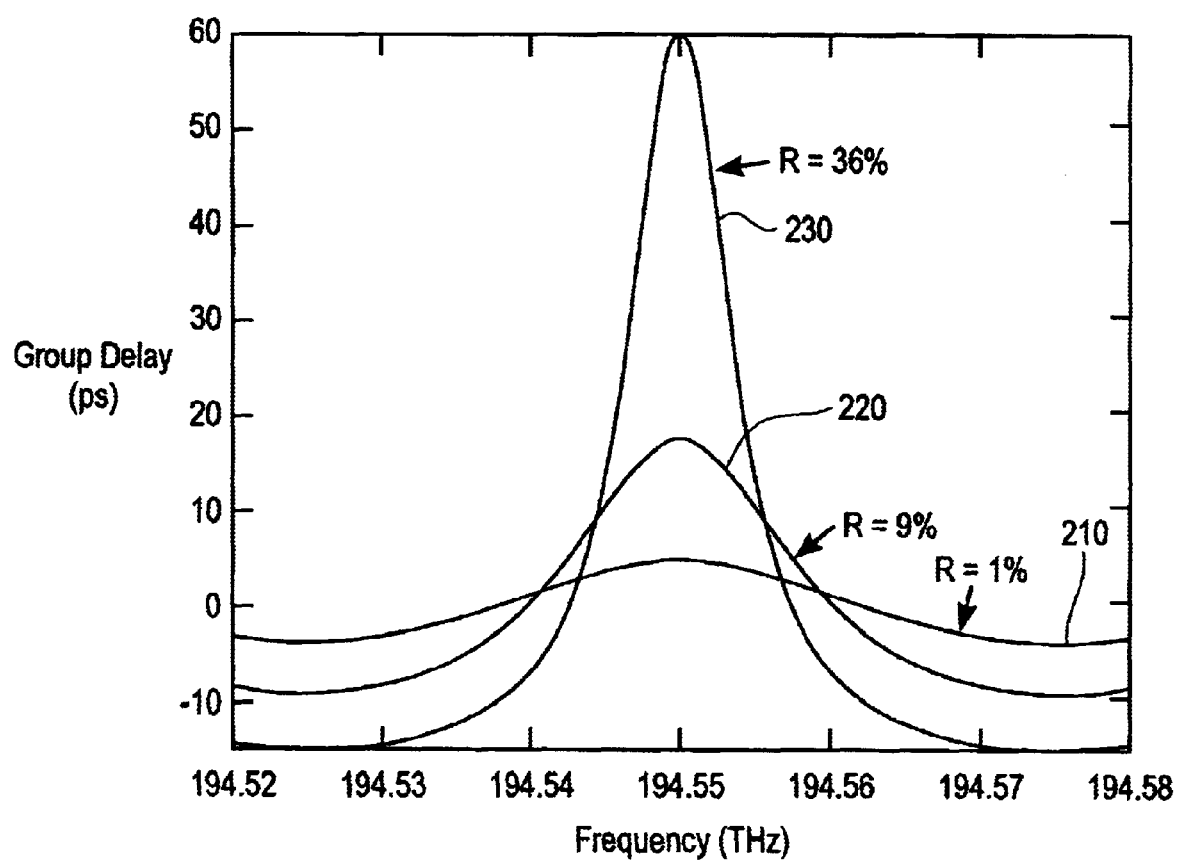
FIG. 2A is a graph of group delay as a function of frequency for the variable reflectivity etalon of FIG. 1.

FIG. 2A is a graph of the group delay τ(ω) as a function of frequency $f$ for three different values of the reflectivity $R=r^2$, where ω=2π$f$=2πc/λ where λ is the wavelength of the optical beam 150 and $f$ the frequency. The curves 210, 220 and 230 correspond to reflectivity values R of 1%, 9% and 36%. The optical path length OPL is assumed to be constant for these curves. The different values of r are realized by varying the point of incidence 155 of the optical beam 150. For example, the point of incidence 155A in FIG. 1 might have a reflectivity R of 1%, resulting in dispersion D corresponding to the group delay curve 210. Similarly, point 155B might correspond to curve 220 and some other point of incidence might correspond to curve 230. Therefore, the group delay and also the dispersion experienced by the optical beam 150 as it propagates through etalon 100 can be varied by varying the point of incidence 155. Note that in this application, the first and second reflective coatings 120 and 130 cannot be metallic since metallic coatings result in unpredictable phase modulation and the dispersion D depends on the phase modulation φ.

Figure 2B:
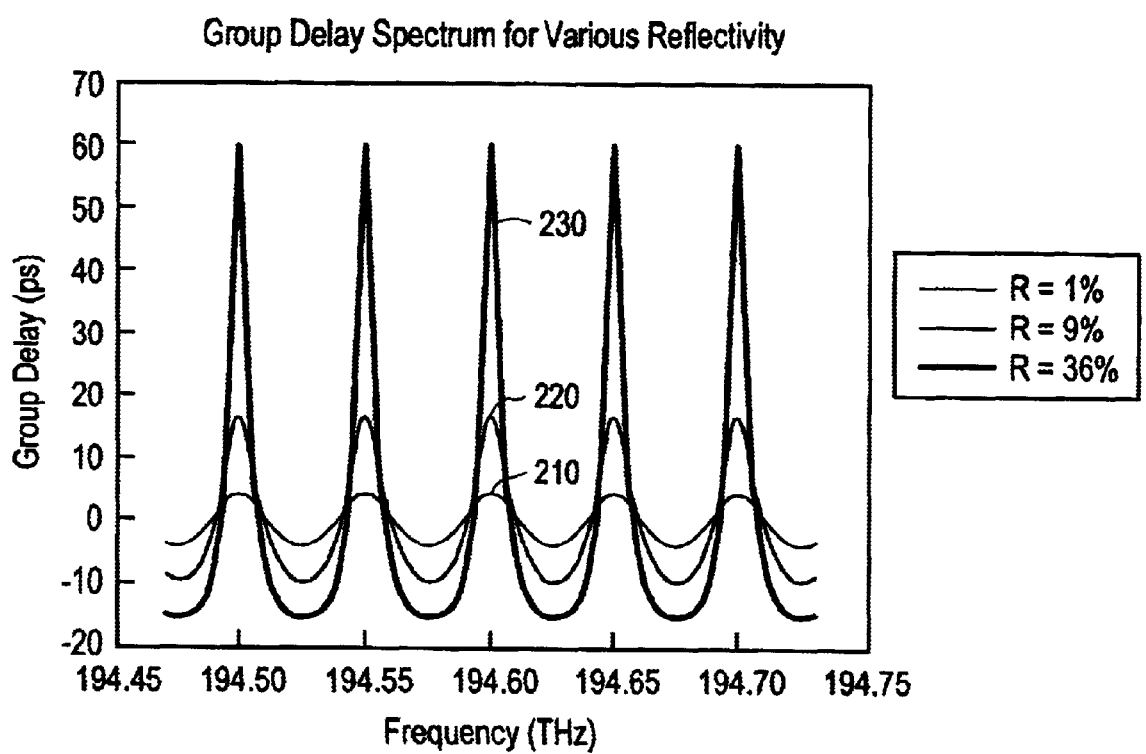
FIG. 2B is a graph of group delay as a function of wavelength illustrating the periodic nature of the group delay function.

Furthermore, the group delay τ(ω) and dispersion D are periodic functions of the wavelength λ. The base period of these functions (also known as the free spectral range of the etalon) is set by the optical path length OPL. FIG. 2B is a graph of the group delay over a broader range of wavelengths (as compared to the graphs in FIG. 2A), illustrating the periodic nature of the function. In general, there is a single maximum and minimum for the group delay function in each period. Both the location of the maxima (or minima) and the free spectral range can be adjusted by changing the OPL. The location of the maxima and minima are sensitive to changes in the phase of the OPL. Significantly changing the free spectral range requires much larger changes in the value of OPL.

The design and selection of materials for etalon 100 depends on the wavelength λ of the optical beam 150, as well as considerations such as the end application, manufacturability, reliability and cost. Current fiber optic communications systems typically use wavelengths in either the 1.3 μm or 1.55 μm ranges and etalons intended for these systems would use corresponding materials. Obviously, the term "transparent body 110" means transparent at the wavelength of interest.

In one example, the etalon 100 is designed for use in the 1.55 μm wavelength range. The incoming optical beam 150 has a center wavelength (or multiple center wavelengths if the optical beam is wavelength division multiplexed) which is consistent with the ITU grid, as defined in the ITU standards.

The body 110 is a single block of optical purity glass, for example fused silica or BK7 glass. The length of body 110 is selected so that the free spectral range of the etalon 100 is matched to the basic periodicity of the ITU grid. For example, the ITU grid defines wave bands which are spaced at 100 GHz intervals. In one application, a fiber optic system implements one data channel per wave band and the free spectral range of the etalon 100 is 100 GHz, thus matching the ITU grid and the spacing of the data channels. In another application, two data channels are implemented in each wave band. The spacing between data channels is then 50 GHz, or half the band to band spacing on the ITU grid. The etalon 100 is designed to have a free spectral range of 50 GHz, thus matching the spacing of the data channels. The etalon can be designed to have a free spectral range that matches other periodicities, including those based on standards other than the ITU standards or those which are intentionally different than the ITU standards. For example, the etalon 100 may be intended for an application consistent with the ITU grid but the free spectral range of the etalon 100 may be different than the ITU periodicity in order to introduce variation in the etalon response from one band to the next. The first and second surfaces 112 and 114 are plane-parallel to within 0.5 arc seconds, typically. The second reflective coating 130 is a Bragg reflector with enough layers to achieve a reflectivity of over 99%

Figure 3A:
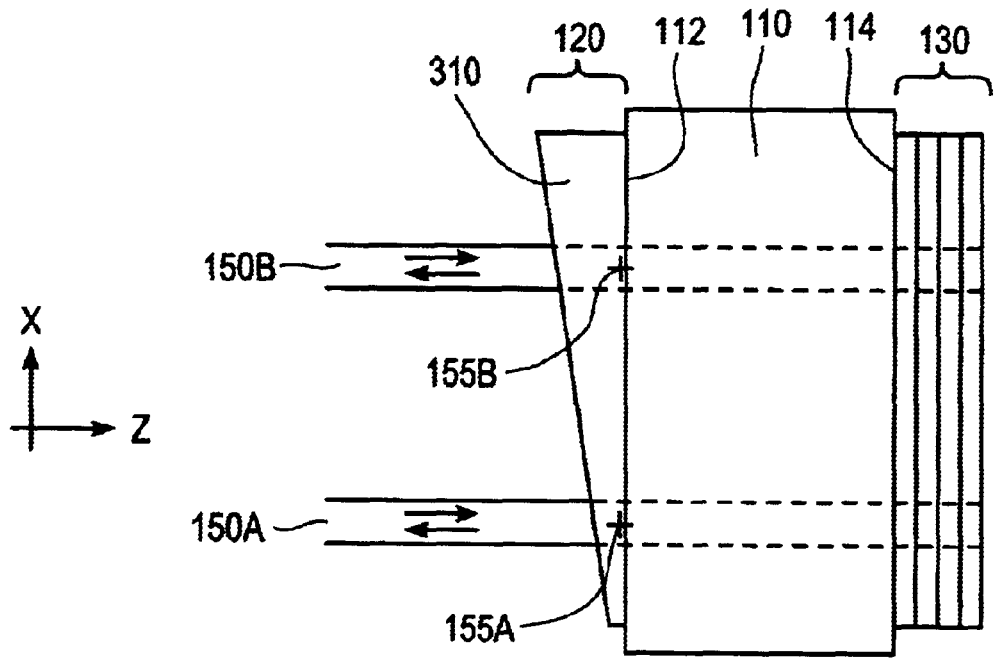
FIGS. 3A–3B are side views of variable reflectivity etalons having a top layer with continuously variable thickness.
Figure 3B:
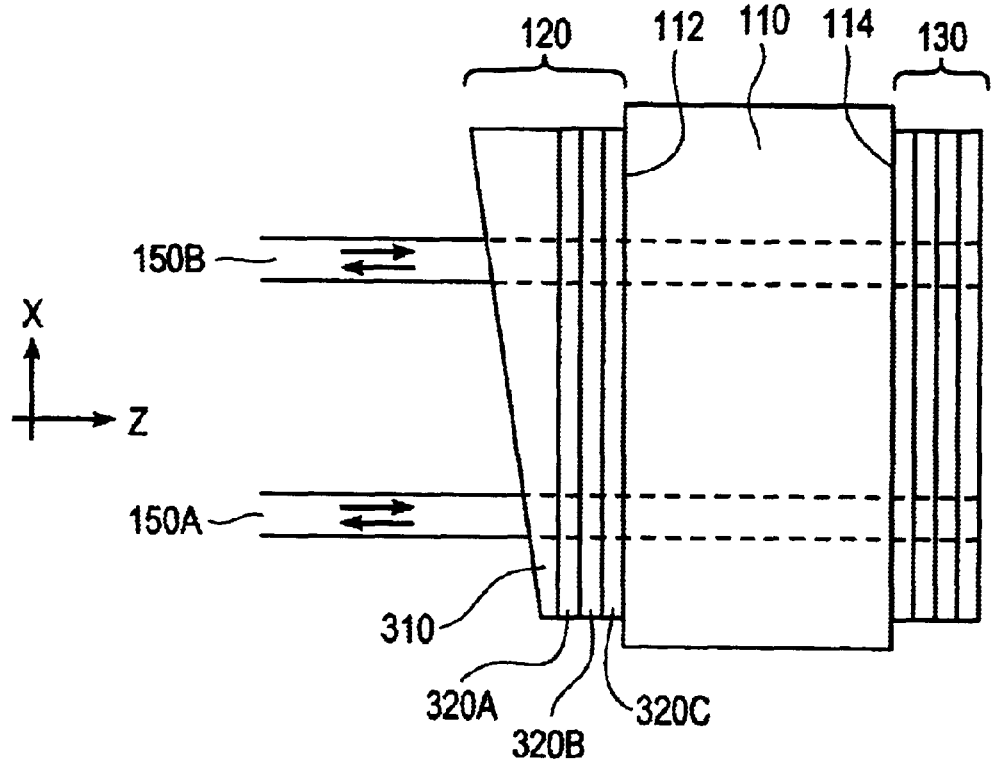

The first reflective coating 120 is a stack containing one or more layers of materials, as shown in the designs of FIGS. 3A and 3B. The detailed structure of the layers determines the range of reflectivities achievable by the first reflective coating 120 and depends on the application. In one embodiment, the first reflective coating 120 contains a single layer 310, as shown in FIG. 3A. The single layer 310 is $Ta_2O_5$ and has a thickness variation of a quarter wave of optical thickness. In other words, the thickest portion of the layer 310 is a quarter wave thicker than the thinnest portion. The corresponding reflectivity varies monotonically over a range from 4%–25%. If the thickness variation stays within a quarter wave (i.e., from zero to a quarter wave, or from a quarter wave to a half wave) then the reflectivity will be a monotonic function of thickness.

In another embodiment, the first reflective coating 120 is a stack of three layers, following the design of FIG. 3B (although the specific example in FIG. 3B shows four layers). Working away from the etalon body, the first two layers are quarter wave layers of $Y_2O_3$ and $SiO_2$, respectively, having refractive indices of 1.75 and 1.44. The top layer is $Ta_2O_5$ with a refractive index of 1.95. The thickness of the top layer varies from zero to a quarter wave. The resulting reflectivity of the first reflective coating varies over a range from 0%–40%.

Typically, by varying the thickness of top layer 310, a reflectivity variation of 40%–50% can be achieved. This variation can be translated to different offsets (e.g., to a range of 10%–60%, or 20%–70%, etc. for a variation of 50%) by varying the number and materials of the layers 320 under the top layer 310. Typically, in the design of FIG. 3B, only the top layer 310 varies in thickness and the remaining layers 320 are an integer number of quarter waves in thickness. The underlying layers 320 typically are not exposed. Materials which are suitable for the Bragg reflector 130 and/or the stack of the first reflective coating 120 include $Ta_2O_5$, $TiO_2$, $SiO_2$, $SiO$, $Pr_2O_3$, $Y_2O_3$, and $HfO_2$.

FIGS. 3–7 illustrate various manners in which the reflectivity can vary over the first surface 112. In FIG. 3A, the first reflective coating 120 includes a top layer 310 of material. The physical thickness of the top layer 310 varies according to location on the first surface 112. In one implementation, the top layer 310 has a constant refractive index and the optical thickness, which is the product of the refractive index and the physical thickness, varies over a range between zero and a quarter wave. In the case where the optical thickness of top layer 310 varies from zero to a quarter wave, the reflectivity will vary from zero at zero thickness to maximum reflectivity at quarter wave thickness. More generally, the thickness varies over a quarter wave (i.e., from zero to a quarter wave, or from a quarter wave to a half wave, or from a half wave to three quarters wave, etc.), resulting in a monotonic variation of reflectivity with thickness.

In the example of FIG. 3A, the thickness of top layer 310 changes monotonically with the linear coordinate x and does not vary Win the y direction (i.e., into or out of the paper). If the optical thickness remains within a quarter wave range, the reflectivity of the first reflective coating 120 will also vary monotonically with x but will be independent of y. The dispersion D will also vary with x and not with y.

The first reflective coating 120 is not restricted to a single layer design. FIG. 3B shows a first reflective coating 120 with multiple layers. In this example, additional layers of material 320A–320C are disposed between the top layer 310 and the first surface 112. In one implementation, these layers 320 are constant refractive index and constant physical thickness. For example, they can be quarter wave layers (or integer multiples of quarter waves). The top layer 310 has a variable physical thickness, as in FIG. 3A. In alternate embodiments, some or all of the intermediate layers 320 may also vary in thickness.

Figure 4:
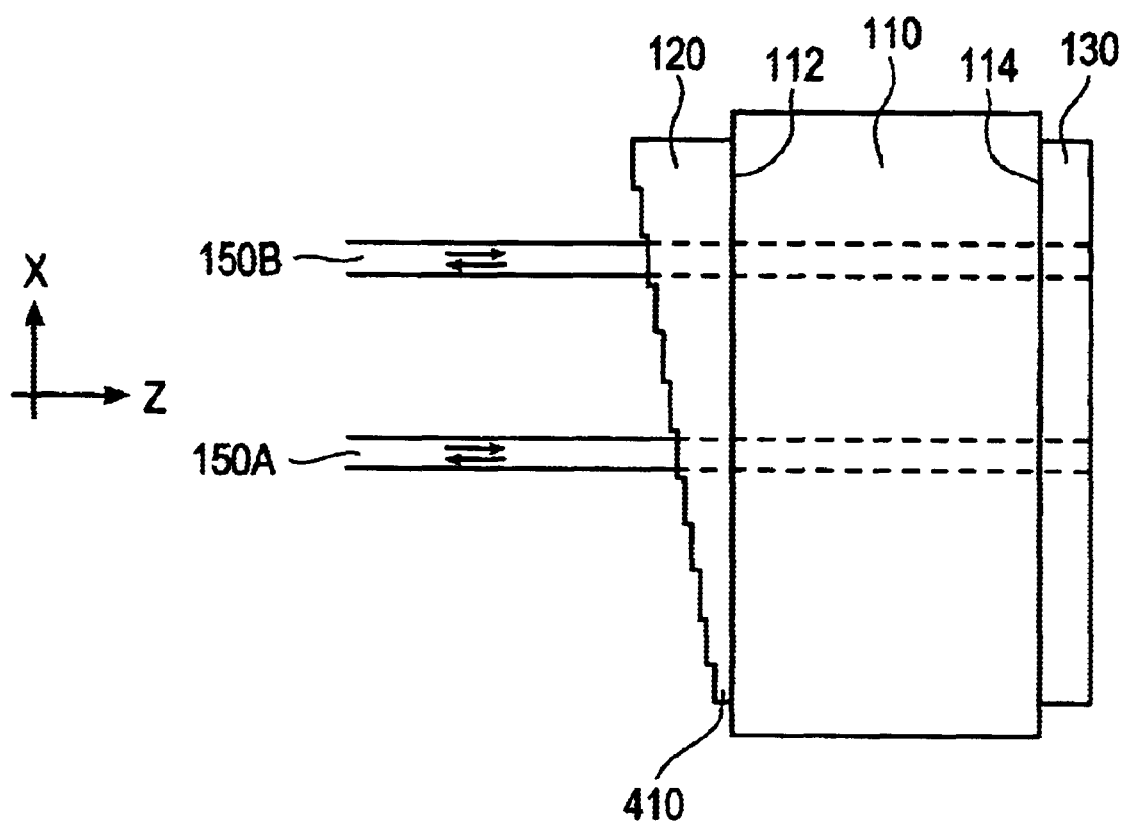
FIG. 4 is a side view of a variable reflectivity etalon having a top layer with stepwise variable thickness.

In the examples of FIGS. 3A and 3B, the reflectivity was a continuous function of location on the first surface. In both examples, the thickness of top layer 310 varied continuously with the linear coordinate x. In FIG. 4, the first reflective coating 120 includes a single layer 410 of material that varies in physical thickness in a stepwise fashion. That is, layer 410 has a constant thickness over some finite region, a different constant thickness over a second region, etc. In FIG. 4, these regions are rectangular in shape, with a finite extent in x but running the length of the etalon in y. However, they can be other shapes. For example, hexagonally-shaped. regions are well matched in shape to circular beams and can be close packed to yield many different regions over a finite area.

Other variations of thickness as a function of position are possible. In this class of variable reflectivity etalons, the reflectivity of first reflective coating 120 is generally determined by the thickness of the coating (or of specific layers within the coating). Therefore, different reflectivity functions may be realized by implementing the corresponding thickness function. For example, reflectivity can be made a linear function of coordinate x by implementing the corresponding thickness variation in the x direction. The required thickness at each coordinate x can be determined since the relationship between thickness and reflectivity is known, for example by using conventional thin film design tools. The reflectivity and/or thickness can also vary according to other coordinates, including y, the polar coordinates r and θ, or as a two-dimensional function of coordinates.

Figure 5A:
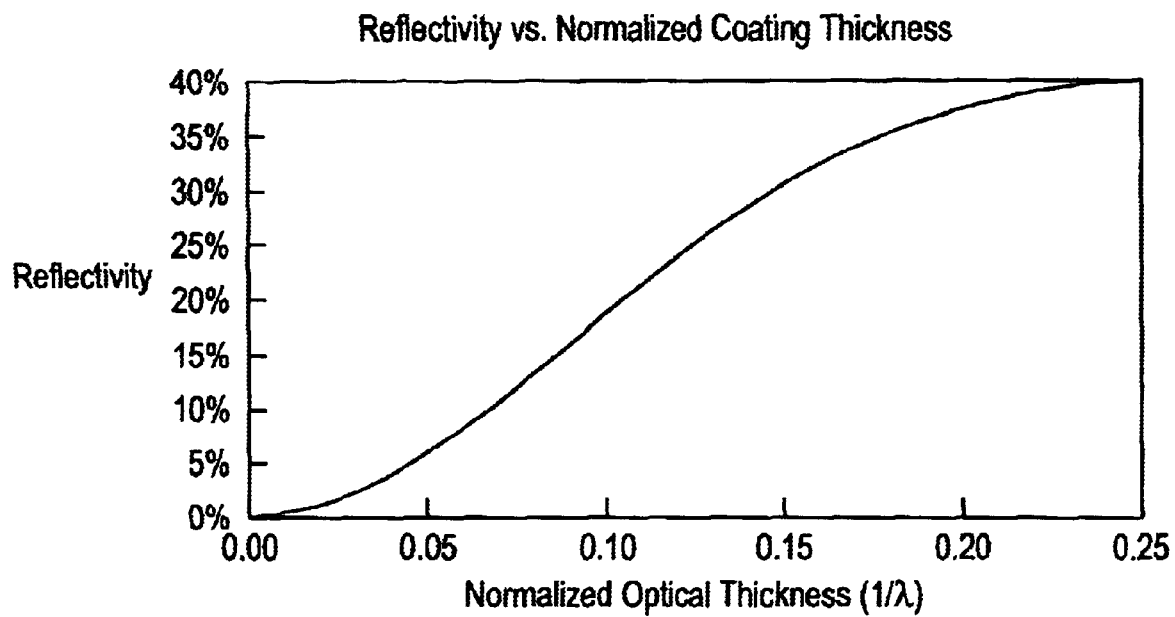
FIG. 5A is a graph of reflectivity as a function of layer thickness.
Figure 5B:
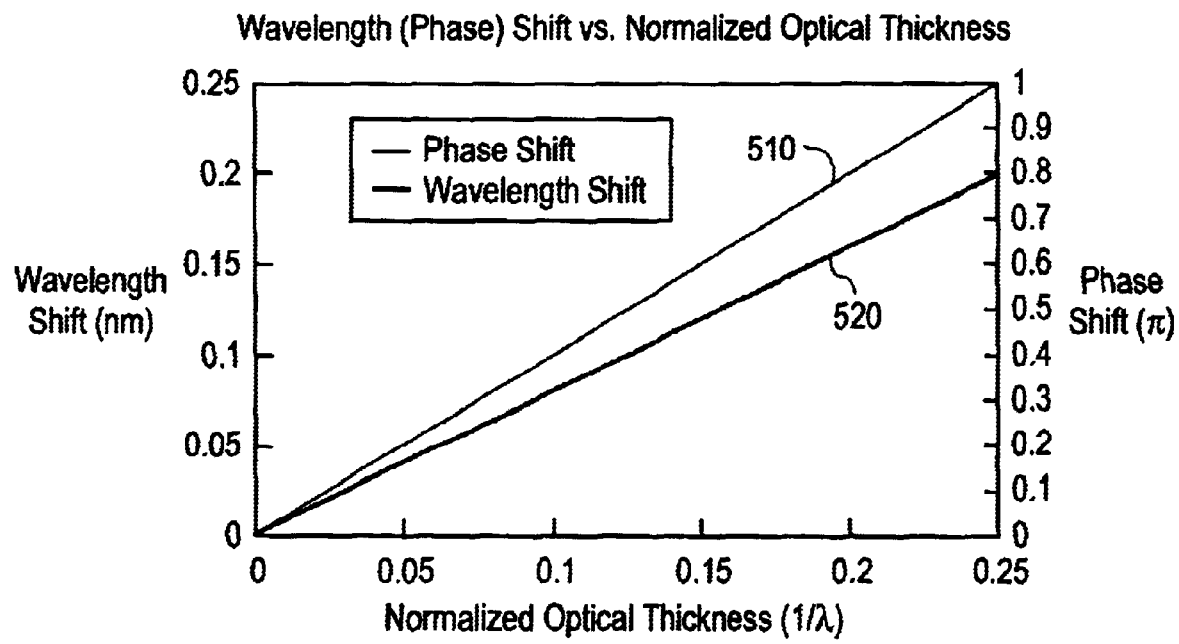
FIG. 5B is a graph of phase shift and wavelength shift in spectral response as a function of layer thickness.

FIGS. 5A–5B are graphs further illustrating the performance of variable reflectivity etalon 100. FIGS. 5A and 5B detail the performance of a 3-layer structure where the top layer 310 which varies in thickness from zero to a quarter wave. However, the general phenomenon illustrated by FIGS. SA and 5B are also applicable to reflective coatings with other numbers of layers. FIG. 5A graphs reflectivity R as a function of thickness of top layer 310. The thickness is typically measured in reference to optical wavelength. Thus, a normalized optical thickness of 0.10 corresponds to a physical thickness that results in 0.10 wavelength. The normalized optical thickness of 0.00 corresponds to zero thickness and the normalized optical thickness of 0.25 corresponds to a quarter wave thickness. The reflectivity varies from 0%–40%. As mentioned previously, the range of reflectivities can be offset and/or expanded by adding more layers 320.

Referring again to the examples in FIGS. 3–4, these examples vary reflectivity by varying the optical thickness of the first reflective coating 120. However, varying the optical thickness also varies the phase of the OPL. This variation is not significant enough to substantially change the free spectral range of the etalon, so the basic periodicity of the etalon response essentially remains fixed. However, this phase variation is significant enough to affect the location of the peak of the etalon response. In other words, referring to FIGS. 2, the curves 210, 220 and 230 will shift slightly to the right or left with respect to each other as a result of the phase shift introduced by the finite thickness of first reflective coating 120.

FIG. 5B graphs this effect. Curve 510 graphs the phase shift in OPL as a function of the layer thickness, which is normalized in wavelength. Curve 520 graphs the corresponding wavelength shift of the spectral response as a function of the layer thickness, assuming a free spectral range of 50 GHz. For example, at a thickness of a quarter wave, the single layer coating introduces a phase shift of π radians, which shifts the spectral response by 0.2 nm relative to the response at zero thickness.

In some cases, it is undesirable to have a phase shift (and corresponding shift of the spectral response). For example, it may be desirable for all of the spectral responses to have peaks and minima at the same wavelengths, as shown in FIGS. 2A and 2B. In these cases, the phase shift caused by thickness variations in the first reflective coating 120 must be compensated for. In one approach, the transparent body 110 has an optical path length which varies with location, and the variation in the transparent body 110 compensates for the variation caused by the first reflective coating 120.

Referring to FIG. 3A, in one example embodiment, the first and second surfaces 112 and 114 of transparent body 110 are not exactly parallel. Rather, they are slightly tilted so that the body 110 is thicker at point 155B than at 155A, thus compensating for the thinner top layer 310 at point 155B.

Figure 6:
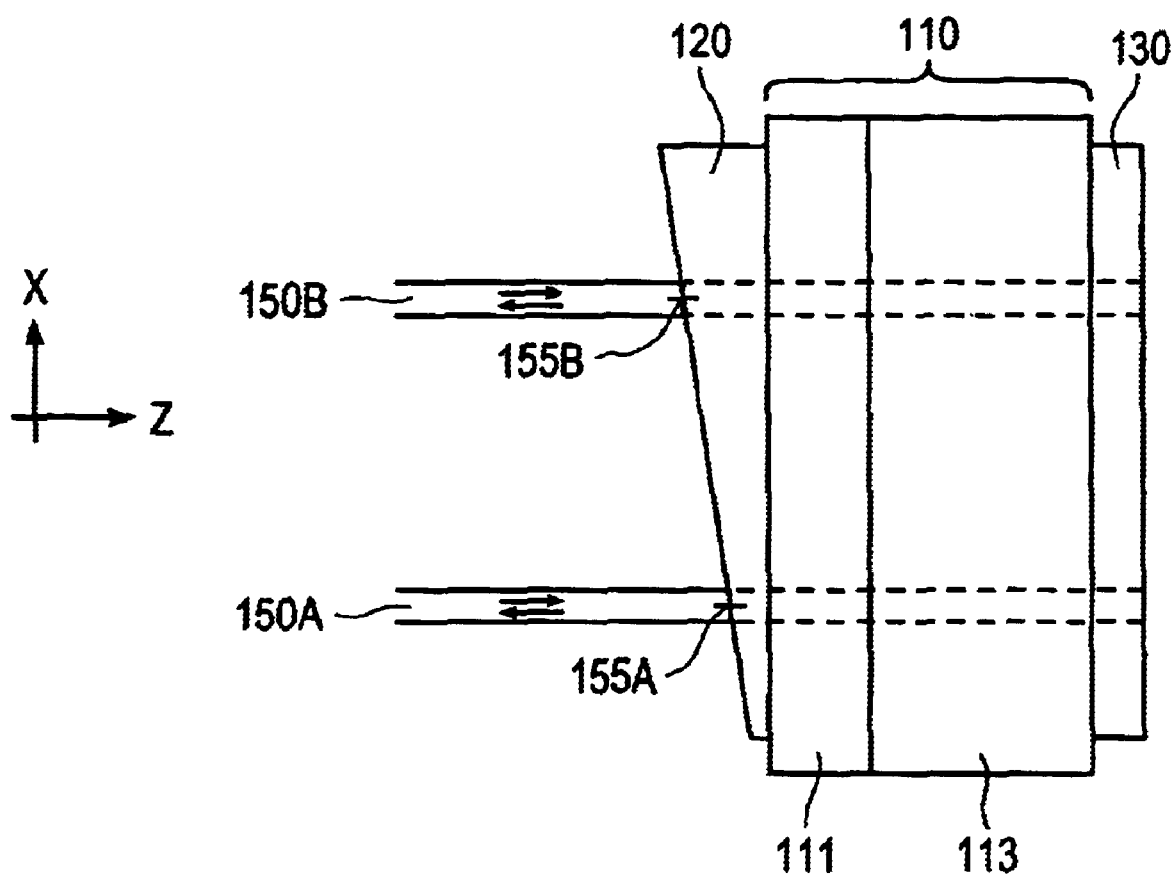
FIG. 6 is a side view of a variable reflectivity etalon with constant optical path length.

In FIG. 6, the transparent body 110 has a constant physical thickness but varying refractive index, thus compensating for phase variations caused by the first reflective coating 120. More specifically, the body 110 includes a gradient index material 111 bonded to a constant index material 113. In the 1.55 μm example described above, Gradium™, (available from LightPath Technology) or liquid crystal is suitable as the gradient index material 111 and fused silica, BK7 or similar glass can be used as the constant index material 113. The refractive index of the gradient index material 111 is higher at point 155B than at 155A. As a result, the optical path length through material 111 is longer at point 155B, thus compensating for the thinner first reflective coating 120.

In an alternate approach, the phase is adjusted by changing the temperature of the etalon 100. Thermal expansion changes the physical dimensions of the etalon, resulting in a corresponding change in optical path lengths. Thus, by changing the temperature of the etalon 100, the dispersion characteristic can also be shifted. In particular, the temperature may be controlled so that a center wavelength of the etalon's spectral response falls at some predefined wavelength.

FIGS. 7A–7C illustrate one method for manufacturing the etalon shown in FIG. 3A. Basically, a top layer 310 of uniform thickness is first deposited on the first surface 112 of the etalon body 110. Then, different thicknesses of the top layer 310 are removed according to the location on the first surface. What remains is a top layer 310 of varying thickness.

In FIG. 7A, a uniform top layer 310 has already been deposited on the etalon body 110 using conventional techniques. The top layer 310 has also been coated with photoresist 710. The photoresist 710 is exposed 715 using a gray scale mask 720. Thus, the photoresist receives a variable exposure. In FIG. 7B, the photoresist 710 has been developed. The gray scale exposure results in a photoresist layer 710 of variable thickness. The device is then exposed to a reactive ion etch (RIE). In areas where there is thick photoresist, the etch removes all of the photoresist and a little of the top layer 310 of the first reflective coating. In areas where there is thin photoresist, the etch removes more of the top layer 310. The end result, shown in FIG. 7C, is a top layer of varying thickness.

FIGS. 7A–7C illustrate a manufacturing process that uses reactive ion etching although other techniques can be used. For example, in a different approach, other uniform etching techniques or ion milling can be used to remove different thicknesses from the top layer 310. Mechanical polishing techniques or laser ablation may also be used. In one laser ablation approach, a laser is scanned across the top layer 310 and ablates different amounts of material at different locations. The result is a top layer 310 of varying thickness. In a different approach, en rather than depositing a top layer 310 of uniform thickness and then removing different amounts of the top layer, a top layer 310 of varying thickness is deposited. Finally, FIGS. 7A–7C describe the manufacture of the etalon in FIG. 3A. However, the techniques described can be used to manufacture other type of variable reflectivity etalons, including those shown in FIGS. 3–6.

FIGS. 8–12 illustrate different ways to translate the point of incidence of the optical beam 150. In all of these examples, the incoming optical signal is shown as arriving via an optical fiber 810 and collimated by a lens 820 to produce the optical beam 150. This is merely a pictorial representation of the input port 800 for optical beam 150. It is not meant to imply that other designs for the input/output ports cannot be used. For example, the optical beam 150 may arrive in a collimated form, the lens may be integrated onto the fiber, the fiber may be replaced by a waveguide, there may be other intermediate devices (e.g., mirrors, beamsplitters, optical filters), etc. Note that the input port 800 can also serve as the output port. In FIGS. 8–12, the optical signal is shown as arriving via fiber 810, collimated by lens 820, propagates through etalon 100, is re-collected by lens 820 and exits via fiber 810. A device such as a circulator can be used to separate the incoming and outgoing optical signals in this case.

Figure 11A:
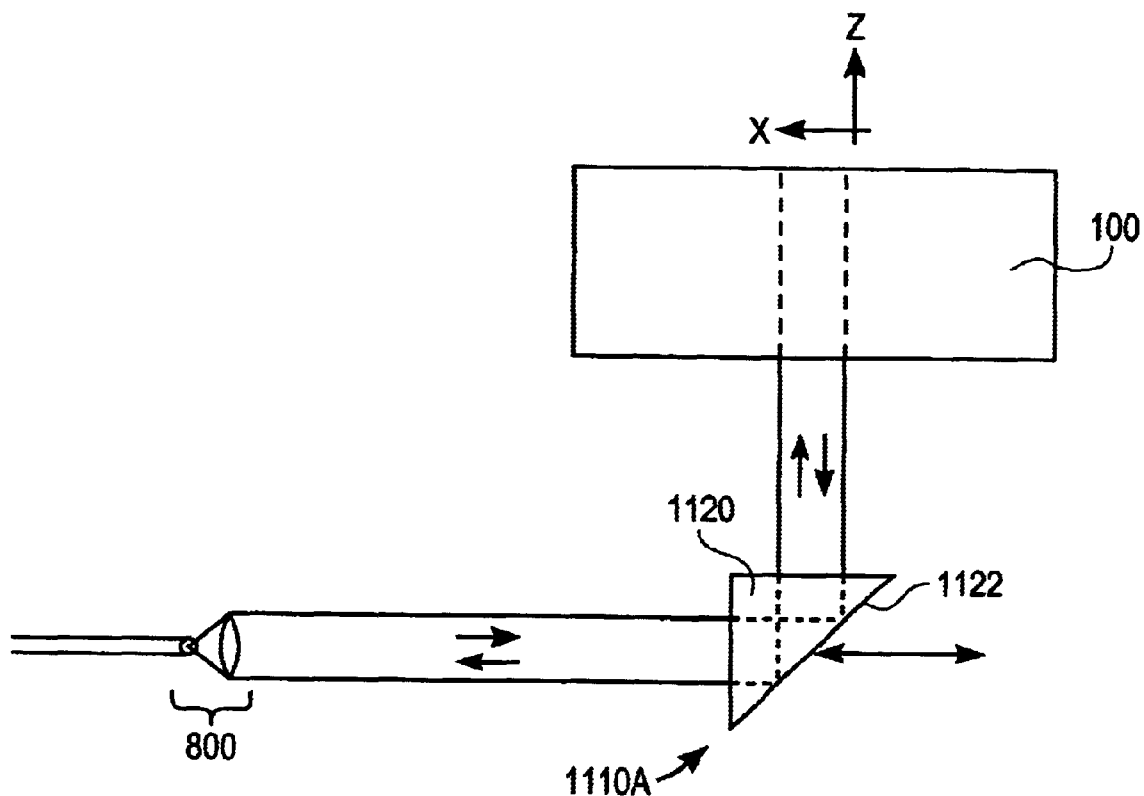
FIGS. 11A–11B are top views of an apparatus that utilizes a moveable reflective beam displacer.
Figure 11B:
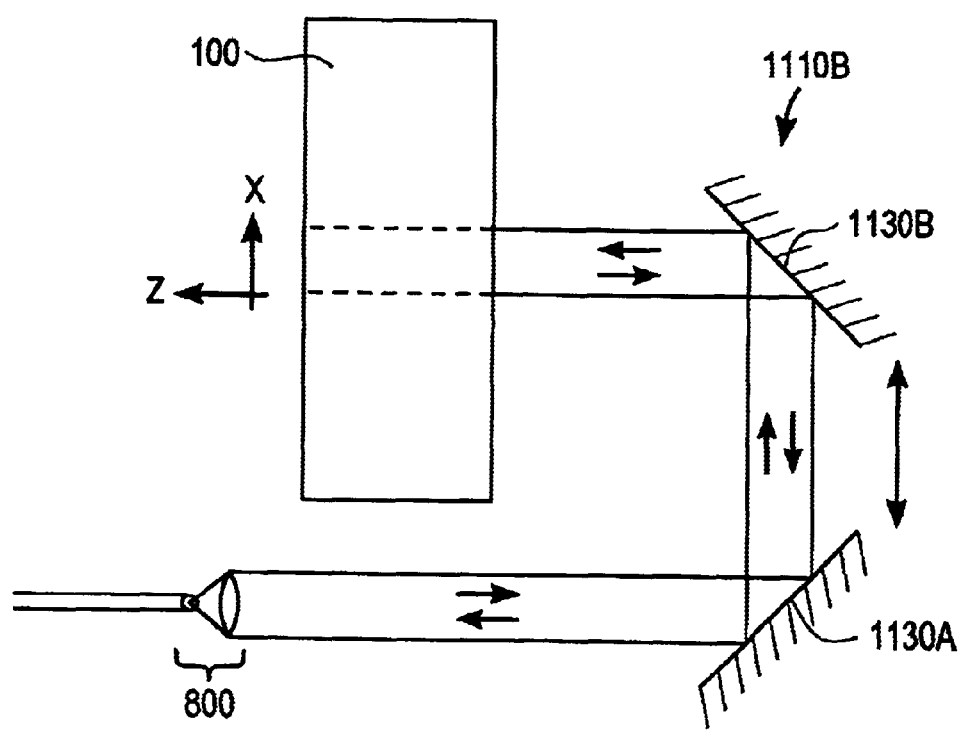
Figure 12:
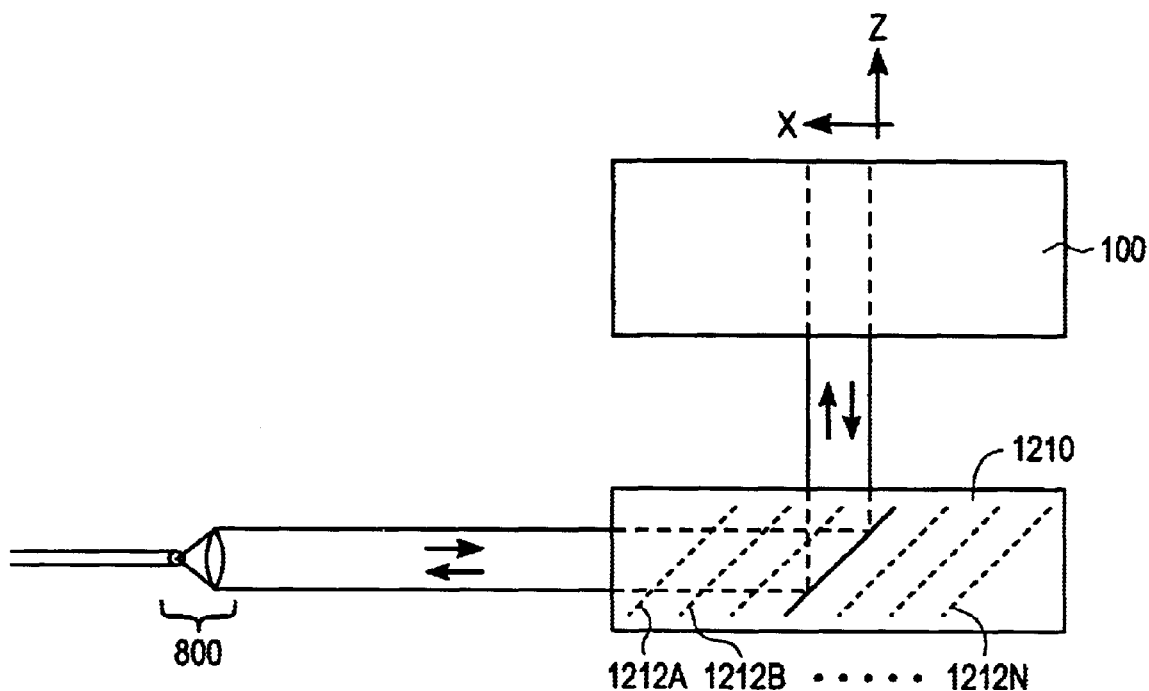
FIG. 12 is a top view of an apparatus that utilizes an electro-optic beam displacer.
Figure 13:
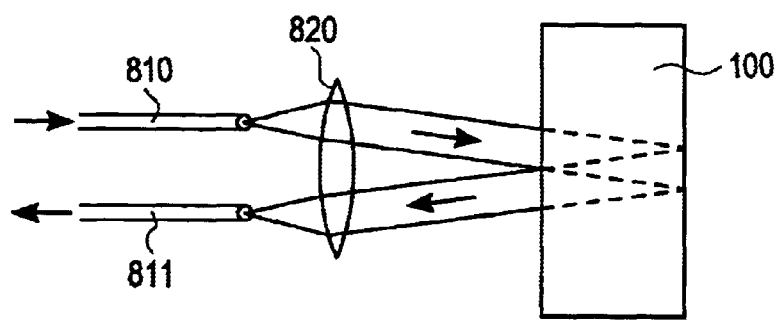
FIG. 13 is a top view of an apparatus that utilizes separate input and output fibers.

FIG. 13 is a top view of an apparatus that uses separate input and output fibers 810 and 811. In this device, the two fibers 810 and 811 are placed symmetrically about the optical axis of the collimating lens 820. Thus, the optical beam 150 will leave fiber 810, reflect through the etalon 100 and return to fiber 811. The optical beam 150 will not be exactly normally incident on the etalon 100. However, some deviation from normal incidence can be tolerated without significantly affecting the overall performance. A typical tolerance is that the beam is within 0.6° of normal to prevent significant effects due to beam walk off, although actual tolerances will depend on the application. The beam displacement approaches described in FIGS. 8–12 below are also generally applicable to the architecture shown in FIG. 13. One advantage of the dual fiber approach is that a circulator (or other similar device) is no longer required to separate the incoming and outgoing beams.

Figure 8:
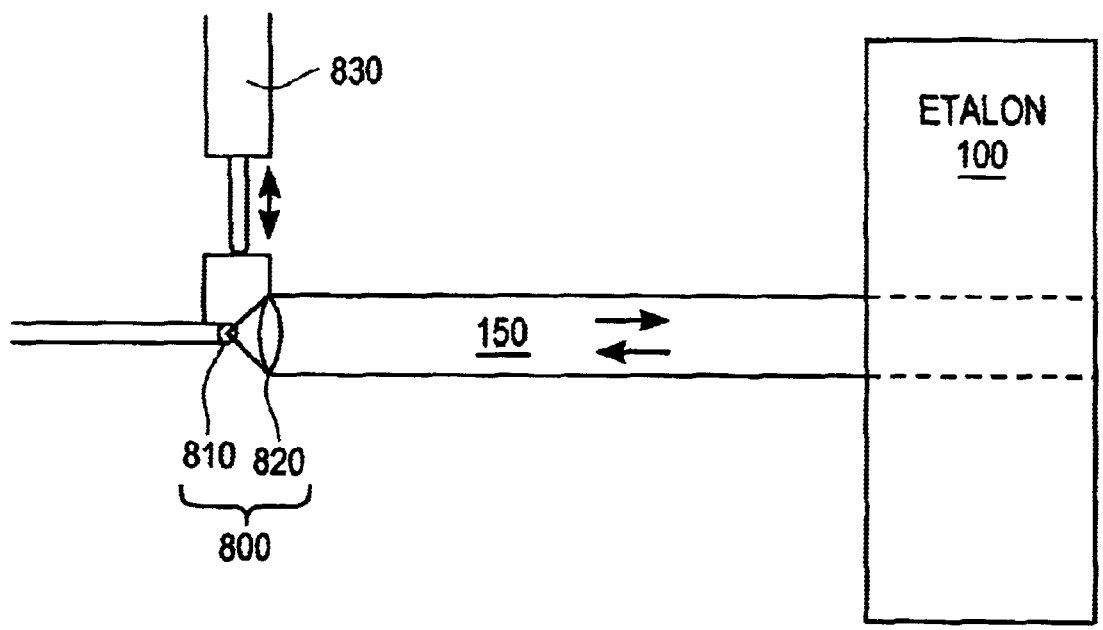
FIG. 8 is a top view of an apparatus in which an optical beam is translated relative to a stationary variable reflectivity etalon.
Figure 9:
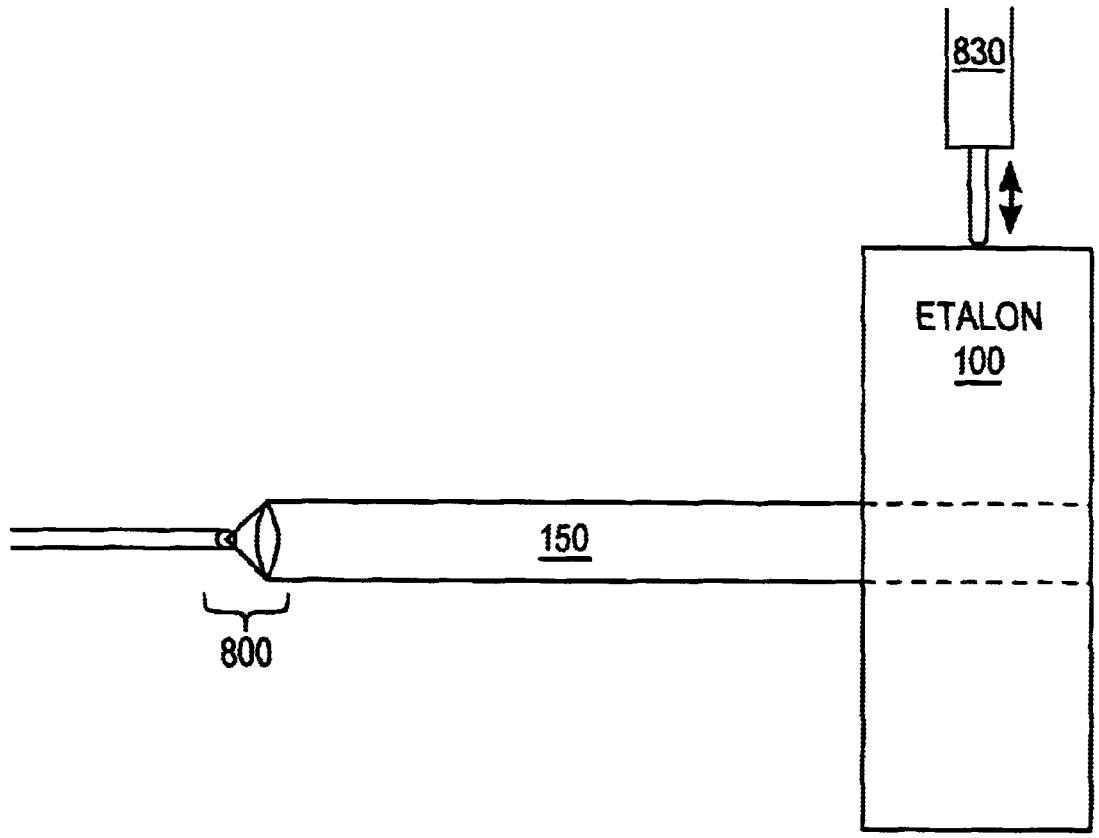
FIG. 9 is a top view of an apparatus in which a variable reflectivity etalon is translated relative to a stationary optical beam.

In FIGS. 8–9, beam displacement is achieved by creating relative movement between the input port 800 and the variable reflectivity etalon 100. In FIG. 8, the input port 800 is translated relative to a stationary variable reflectivity etalon 100. In particular, a mechanical actuator 830 moves the fiber 810 and collimating lens 820, thus moving the point of incidence. More generally, an actuator which is physically connected to the input port 800 can be used to translate the input port 800 relative to the etalon 100, thus changing the point of incidence. In FIG. 9, a mechanical actuator 830 is connected to the etalon 100 and translates the variable reflectivity etalon 100 relative to a stationary optical beam 150. In other implementations, both the input port 800 and the etalon 100 can be moved simultaneously.

In FIGS. 10–12, the input port 800 and etalon 100 remain in fixed locations relative to each other. A separate beam displacer 1010, 1110, 1210 is located in the optical path between the input port 800 and etalon 100. The beam displacer is used to change the point of incidence of the optical beam 150 to different locations on the etalon's first surface while maintaining normal incidence of the optical beam on the etalon's first surface.

FIGS. 10A–10B are a perspective view and a top view of an apparatus in which the beam displacer 1010 is rotated in order to change the point of incidence. In this example, the beam displacer 1010 includes a transparent body 1020 that has an input surface 1022 and an output surface 1024. The beam displacer 1010 is located in the optical path of the optical beam 150 and rotates about an axis 1040 which is perpendicular to the direction of propagation of the optical beam 150. In this example, the input and output surfaces 1022 and 1024 are plane-parallel to each other. In FIGS. 10, the optical beam 150 propagates in the z direction, the reflectivity of etalon 100 varies in the x direction, and the axis of rotation 1040 is in the y direction.

The beam displacer 1010 operates as follows. The optical beam 150 enters the transparent body 1020 through the input surface 1022 and exits the body 1020 through the output surface 1024. Since the two surfaces 1022 and 1024 are parallel to each other, the exiting beam propagates in the same direction as the incoming beam, regardless of the rotation of the beam displacer 1010. As a result, the exiting beam always propagates in the z direction and the etalon 100 is oriented so that the beam 150 is normally incident upon it. Rotation of the beam displacer 1010 about they axis produces a translation of the optical beam in the x direction due to refraction at the two surfaces 1022 and 1024. The reflectivity of the first reflective coating 120 also varies in the x direction. Thus, different reflectivities for etalon 100 can be realized by rotating the beam displacer 1010.

FIGS. 10 also show the etalon 100 as being mounted on a thermoelectric cooler 1050. The cooler 1050 is in thermal contact with the transparent body of the etalon 100 and is used to control the temperature of the etalon since the temperature affects the free spectral range and dispersion curve of the etalon. Other types of temperature controllers may be used in place of the thermoelectric cooler 1050.

In FIGS. 11A–11B, the beam displacers 1110A and 1110B are based on translatable reflective surfaces. Generally speaking, the optical beam 150 reflects off of at least one reflective surface en route to the etalon 100. By translating the reflective surface, the point of incidence for the optical beam 150 is moved but the normal incidence is maintained. In FIG. 11A, the beam displacer 1110A includes a right angle prism 1120 and the reflective surface is the hypotenuse 1122 of the prism. The optical beam 150 enters the prism, total internally reflects off the hypotenuse 1122 and exits the prism to the etalon 100. By translating the prism 1120, the point of incidence on the etalon can be moved. Note that the prism can be translated in many directions. For example, translating in either the x or z direction will result in movement of the point of incidence.

In FIG. 11B, the beam displacer 1110B includes a pair of mirrors 1130A–B. At each mirror 1130, the optical beam 1150 reflects at a right angle. Translating the mirrors 1130 in the x direction moves the point of incidence.

The beam displacers shown in FIGS. 11 are merely examples. In both of these cases, mirrors and prisms (or other types of reflective surfaces) can be substituted for each other. Furthermore, it is not necessary that the reflections occur at right angles or that the prism be a right angle prism. Other geometries can be utilized.

In FIG. 12, the beam displacer 1210 is electro-optic. In this example, the beam displacer 1210 is an electro-optic device which has a number of mirrors that can be turned on and off electro-optically. By turning on different mirrors, the optical beam 150 is deflected to different points of incidence. More generally, the device has a number of states, each of which directs the optical beam 150 to a different location on the etalon's first surface. Other technologies, including acousto-optic and micro electro-mechanical (MEMS), can also be used.

Although the invention has been described in considerable detail with reference to certain preferred embodiments thereof, other embodiments will be apparent. Therefore, the scope of the appended claims should no be limited to the description of the preferred embodiments contained herein.

What is claimed is:

1. A variable reflectivity etalon comprising:
   a transparent body having a first surface and a second surface that is substantially plane-parallel to the first surface;
   a second dielectric reflective coating disposed upon the second surface; and
   a first dielectric reflective coating disposed upon the first surface, the first reflective coating having a reflectivity that varies according to location on the first surface.

2. The variable reflectivity etalon of claim 1 wherein the first reflective coating comprises:
   a top layer having a physical thickness that varies according to location on the first surface and a refractive index that does not vary according to location on the first surface.

3. The variable reflectivity etalon of claim 2 wherein the top layer has an optical thickness variation of not more than a quarter wave.

4. The variable reflectivity etalon of claim 2 wherein the top layer is plane-parallel to the second surface to within 0.5 arc seconds.

5. The variable reflectivity etalon of claim 2 wherein the first reflective coating further comprises:
   at least one additional layer disposed between the top layer and the first surface, wherein the additional layers have a physical thickness and a refractive index that do not vary according to location on the first surface.

6. The variable reflectivity etalon of claim 5 wherein each additional layer has an optical thickness that is an integer multiple of a quarter wave.

7. The variable reflectivity etalon of claim 2 wherein the top layer is selected from a group consisting of $Ta_2O_5$, $TiO_2$, $SiO_2$, $SiO$, $Pr_2O_3$, $Y_2O_3$, and $HfO_2$.

8. The variable reflectivity etalon of claim 1 wherein the first reflective coating comprises:
   a top layer having an optical thickness that varies according to location on the first surface.

9. The variable reflectivity etalon of claim 1 wherein the reflectivity of the first reflective coating is a continuous function of location on the first surface.

10. The variable reflectivity etalon of claim 1 wherein the reflectivity of the first reflective coating is a piecewise flat function of location on the first surface.

11. The variable reflectivity etalon of claim 1 wherein the reflectivity of the first reflective coating is a monotonic function with respect to a linear coordinate of the first surface.

12. The variable reflectivity etalon of claim 1 wherein the reflectivity of the first reflective coating varies over at a range of at least 40%.

13. The variable reflectivity etalon of claim 1 wherein the first reflective coating has a minimum reflectivity of not more than 1%.

14. The variable reflectivity etalon of claim 1 wherein;
   the etalon is configured to receive an optical beam;
   the optical beam is normally incident upon the etalon's first surface at a point of incidence and the optical beam is characterized by a spot size at the point of incidence;
   each location on the etalon's first surface is characterized by a dispersion curve that depends on the reflectivity of the first reflective coating at that location; and
   the dispersion curve is substantially invariant over the spot size.

15. The variable reflectivity etalon of clam 1 wherein:
   the etalon is suitable for use in an application with a predefined periodic spacing of wavelength bands;
   the etalon is characterized by a free spectral range; and
   the free spectral range of the etalon is approximately equal to the predefined periodic spacing of the wavelength bands.

16. The variable reflectivity etalon of claim 1 wherein:
   the etalon is suitable for use in an application with a predefined periodic spacing of wavelength bands;
   the etalon is characterized by a free spectral range; and the free spectral range of the etalon is equal to a predefined value that varies from the predefined periodic spacing of the wavelength bands.

17. The variable reflectivity etalon of claim 1 wherein the transparent body consists of a single block of material.

18. The variable reflectivity etalon of claim 1 wherein the transparent body comprises:
   at least two blocks of different material.

19. The variable reflectivity etalon of claim 1 wherein the transparent body comprises:
   an air space.

20. The variable reflectivity etalon of claim 1 wherein an optical path length of a round trip through the etalon does not vary with location on the first surface.

21. The variable reflectivity etalon of claim 20 wherein:
   the first reflective coating has an optical path length which varies with location on the first surface;
   the transparent body has an optical path length which varies with location on the first surface; and
   the variation in optical path length of the transparent body compensates for the variation in optical path length of the first reflective coating.

22. The variable reflectivity etalon of claim 1 wherein the second reflective coating has a reflectivity of substantially 100%.

23. The variable reflectivity etalon of claim 22 wherein the first reflective coating comprises:
   a top layer having a physical thickness that varies according to location on the first surface and a refractive index that does not vary according to location on the first surface.

24. The variable reflectivity etalon of claim 23 wherein the top layer has an optical thickness variation of not more than a quarter wave.

25. The variable reflectivity etalon of claim 23 wherein the first reflective coating further comprises:
   at least one additional layer disposed between the top layer and the first surface, wherein the additional layers have a physical thickness and a refractive index that do not vary according to location on the first surface.

26. The variable reflectivity etalon of claim 22 wherein the reflectivity of the first reflective coating varies over a range of at least 40%.

27. The variable reflectivity etalon of claim 22 wherein:
   the etalon is suitable for use in an application with a predefined periodic spacing of wavelength bands;
   the etalon is characterized by a free spectral range; and
   the free spectral range of the etalon is approximately equal to the predefined periodic spacing of the wavelength bands.

28. An etalon apparatus comprising:
   an input port for receiving an optical beam;
   a variable reflectivity etalon comprising:
      a transparent body having a first surface and a second surface that is substantially plane-parallel to the first surface;
      a second dielectric reflective coating disposed upon the second surface; and
      a first dielectric reflective coating disposed upon the first surface, the first reflective coating having a reflectivity that varies according to location on the first surface; and
   wherein the optical beam is normally incident upon the etalon at a point of incidence and the point of incidence is tunable.

29. The etalon apparatus of claim 28 further comprising:
   a temperature controller coupled to the etalon for controlling a temperature of the etalon, wherein the temperature controller adjusts the temperature of the etalon to a point where a center wavelength of a spectral response of the etalon equals a predefined wavelength.

30. The etalon apparatus of claim 29 wherein the temperature controller comprises:
   a thermo electric cooler in thermal contact with the transparent body of the etalon.

31. The etalon apparatus of claim 28 further comprising:
   an actuator physically connected to the input port for translating the input port.

32. The etalon apparatus of claim 28 further comprising:
   an actuator physically connected to the etalon for translating the etalon.

33. The etalon apparatus of claim 28 filer comprising:
   a beam displacer located in an optical path between the input port and the etalon, wherein the beam displacer translates a point of incidence of the optical beam to different locations on the etalon's first surface while maintaining normal incidence of the optical beam on the etalon's first surface, and the input port is in a fixed location relative to the etalon.

34. The etalon apparatus of claim 33 wherein the beam displacer comprises:
   a second transparent body having an input surface and an output surface, wherein:
      the optical beam enters the second transparent body through the input surface and exits the second transparent body through the output surface and directed to the etalon,
      the second transparent body is rotatable about an axis perpendicular to a direction of propagation of the optical beam, and
      rotating the second transparent body about the axis translates the point of incidence to different locations on the etalon's first surface.

35. The etalon apparatus of clam 33 wherein the beam displacer comprises:
   at least one translatable reflective surface disposed to receive the optical beam and reflect the optical beam to the etalon, wherein translating the reflective surface translates the point of incidence to different locations on the etalon's first surface.

36. The etalon apparatus of claim 33 wherein the beam displacer comprises:
   an electro-optic device disposed to receive the optical beam and direct the optical beam to the etalon, wherein the electro-optic device has a plurality of states that direct the optical beam to different locations on the etalon's first surface.

37. A method for manufacturing an etalon with variable reflectivity, the method comprising:
   holding a transparent body having a planar first surface and a second surface flat is substantially plane-parallel to the fist surface, so that the first surface is accessible; and
   creating a first dielectric reflective coating on the first surface, the first reflective coating having a reflectivity that varies according to location on the first surface.

38. The method of claim 37 wherein creating a first dielectric reflective coating on the first surface comprises:
   depositing a top layer of uniform thickness; and
   removing different thicknesses of the top layer according to location on the first surface.

39. The method of claim 38 wherein removing different thicknesses of the top layer comprises reactive ion etching away different thicknesses of the top layer.

40. The method of claim 38 wherein removing different thicknesses of the top layer comprises laser ablating different thicknesses of the top layer.

41. The method of claim 38 wherein removing different thicknesses of the top layer comprises ion milling different thicknesses of the top layer.

42. The method of claim 38 wherein removing different thicknesses of the top layer comprises mechanically polishing the top layer to different thicknesses according to location.

43. The method of claim 38 wherein removing different thicknesses of the top layer comprises:
   depositing a photoresist layer on the top layer, the photoresist layer having different thicknesses according to location; and
   etching away the photoresist layer and top layer in a uniform etching process.

44. The method of claim 37 wherein creating a first dielectric reflective coating on the first surface comprises:
   depositing a top layer, wherein the top layer has different thicknesses according to location.

* * * * *

UNITED STATES PATENT AND TRADEMARK OFFICE
CERTIFICATE OF CORRECTION

PATENT NO. : 6,621,614 B1
DATED : September 16, 2003
INVENTOR(S) : Qin Zhang

It is certified that error appears in the above-identified patent and that said Letters Patent is hereby corrected as shown below:

<u>Column 14,</u>
Line 17, please replace "filer" with -- further --.
Line 56, please delete "flat".
Line 57, please replace "fist" with -- first --.

Signed and Sealed this

Eleventh Day of November, 2003

JAMES E. ROGAN
*Director of the United States Patent and Trademark Office*